Dec. 28, 1954  R. R. BROWN  2,697,855
MANUFACTURE OF TRANSFORMERS
Filed Dec. 10, 1949  2 Sheets-Sheet 1
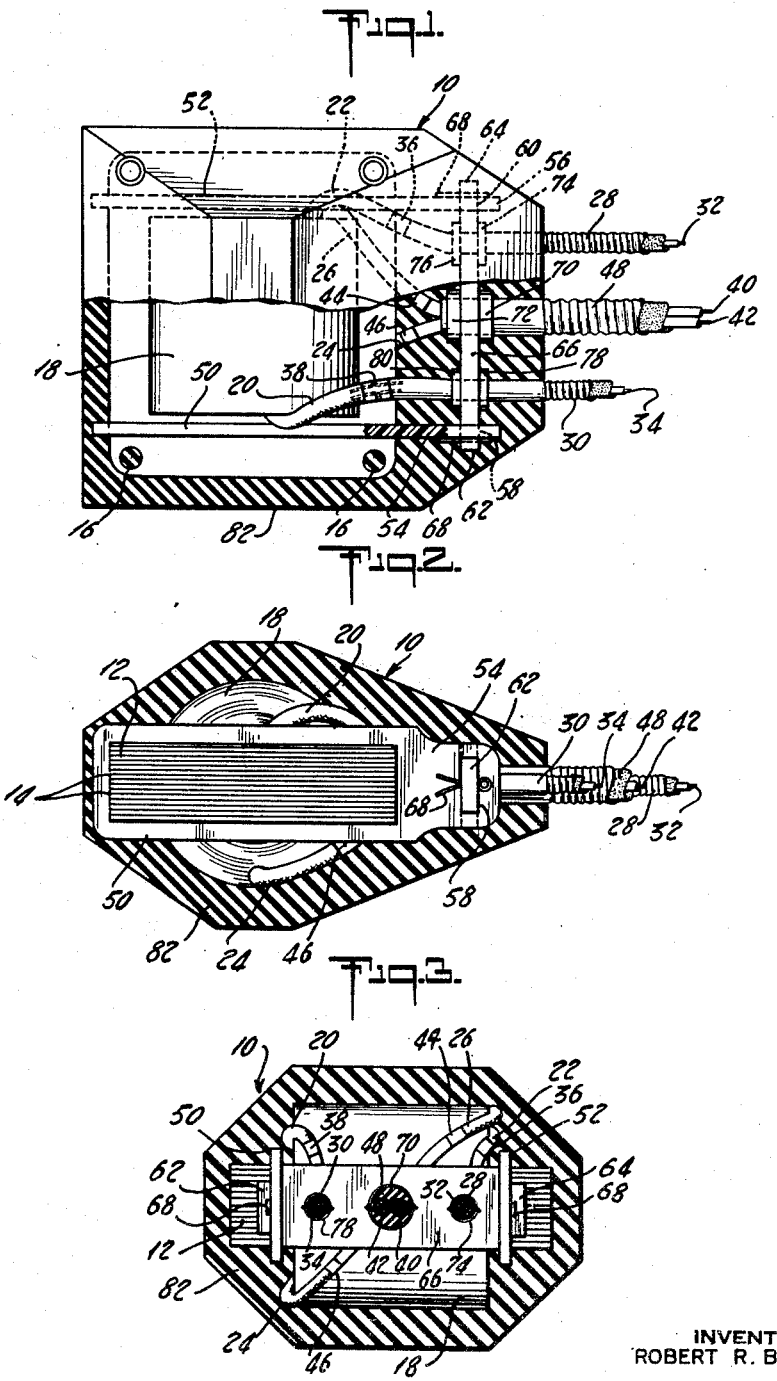
INVENTOR
ROBERT R. BROWN
BY Arthur G. Prangley
ATTORNEY Dec. 28, 1954   R. R. BROWN   2,697,855
MANUFACTURE OF TRANSFORMERS
Filed Dec. 10, 1949   2 Sheets-Sheet 2
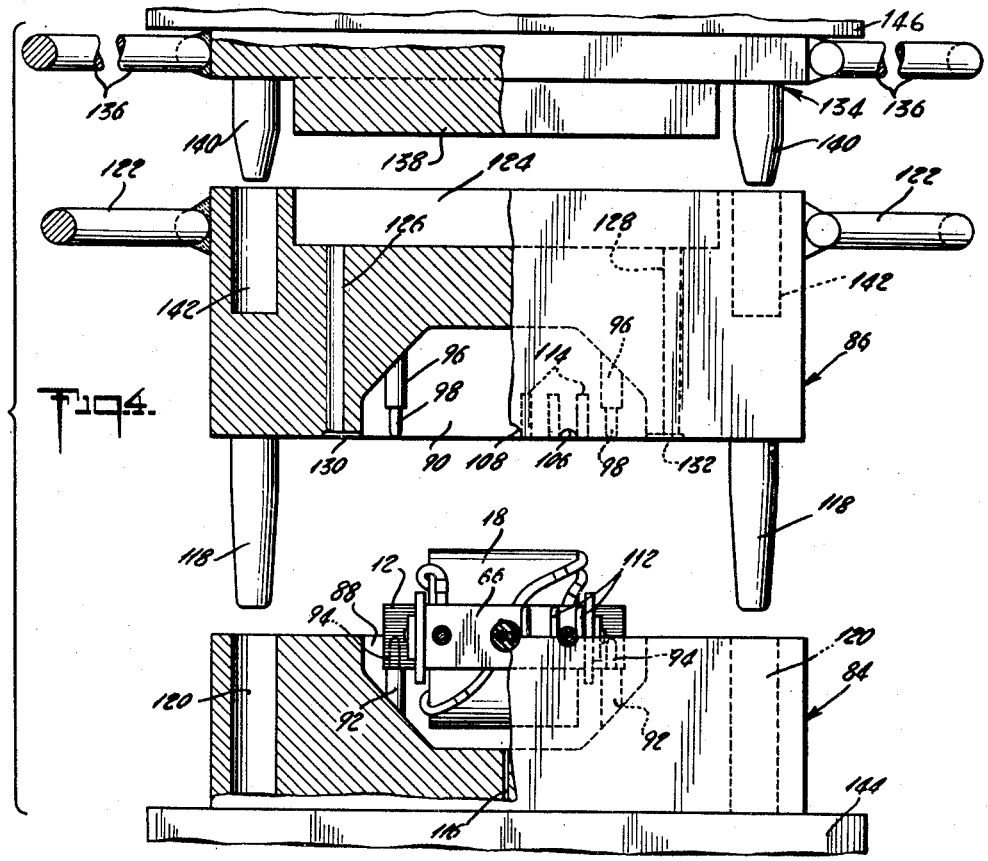
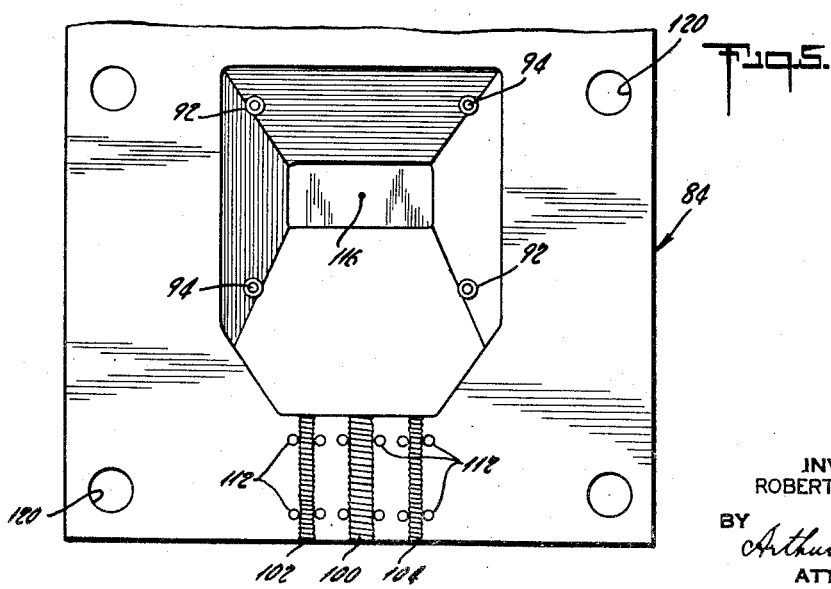
INVENTOR
ROBERT R. BROWN
BY Arthur J. Prangley
ATTORNEY

United States Patent Office 2,697,855
Patented Dec. 28, 1954

2,697,855

MANUFACTURE OF TRANSFORMERS

Robert R. Brown, Union, N. J., assignor to Elastic Stop Nut Corporation of America, a corporation of New Jersey Application December 10, 1949, Serial No. 132,336

9 Claims. (Cl. 18—59)

The present invention relates to the manufacture of transformers, particularly of the kind in which the core and coil assembly is enclosed within a casing of material molded around the assembly and bonded to the sheathing of the input and output cables attached to the coils, to provide a hermetically sealed transformer unit capable of being directly buried in the ground without deterioration of its mechanical or electrical characteristics for long periods of time.

In the manufacture of transformers of the kind to which the invention is particularly adapted, the core and coil assembly, with the conductors of the input and output cables connected to the coils, is placed in a cavity in a suitable mold in spaced relation to the walls of the cavity, and thereafter moldable material suitable for the desired casing is forced into the cavity under pressure to fill the space in the cavity around the inserted assembly and the voids in the latter. While a variety of molding materials may be employed, those that have proved to be most suitable for producing the desired end product fall within the general class requiring heat as well as pressure in order to properly carry out the molding operation and many of the more suitable materials within that category further require a "curing" period during which the material is maintained at elevated temperature in the mold after the mold cavity has been filled.

It is the general object of this invention to improve upon the methods heretofore employed in the molding of transformers of the kind under consideration so as to shorten the time of the molding cycle, to improve the flow of the molded material into the voids in the transformer structure, to secure more uniform curing of the molded material and to minimize the possibility of overcuring localized portions of the material. In order to achieve the above and other more detailed objects and advantages hereinafter appearing, the invention contemplates utilizing certain of the available electrical characteristics of a transformer to heat the transformer and maintain it in heated condition during the molding and curing steps of the manufacture.

The invention is particularly useful in connection with the manufacture of transformers as disclosed in the co-pending application of L. M. Merrill et al., Serial No. 132,335, filed December 10, 1949, and by way of example but without limitation the present invention will be described as it is applied in such manufacture of a transformer of the kind illustrated in said application.

In the accompanying drawings, forming a part hereof:

Fig. 1 is a top plan view, partly in section, of a transformer unit embodying the invention;

Fig. 2 is a vertical longitudinal view, partly in elevation and partly in section, of the unit shown in Fig. 1;

Fig. 3 is a vertical transverse view, partly in elevation and partly in section, of the unit shown in Fig. 1;

Fig. 4 is an exploded view partly in section and partly in elevation, of molding apparatus for producing a transformer unit embodying the invention, with a transformer in place preparatory to the molding operation; and Fig. 5 is a top plan view of the lower mold block of Fig. 4.

Referring now to Figs. 1 to 3 of the drawings a transformer unit of a kind to which the invention may be applied is indicated generally at 10. In the embodiment illustrated the transformer core 12 is formed in known manner by a number of plate-like metal laminations 14 held in assembled relation by rivets 16 and having suitable apertures through which the coils of the primary and secondary windings of the transformer, shown generally at 18, pass. In the present example, the terminal ends of the primary winding are indicated at 20 and 22, respectively, while the terminal ends of the secondary winding appear at 24 and 26. Cables 28 and 30 provide for the supply of current to the primary winding through metal conductors 32 and 34 connected at 36 and 38 respectively by soldering or any other suitable electrical connecting means to the ends of the primary winding. Similarly the conductors 40 and 42 are connected at 44 and 46 to the ends of the secondary winding. In the present instance the primary conductors are carried in and form parts of separate cables, while the secondary conductors are carried in and form parts of a common cable 48.

The several cables are mechanically anchored to the structure of the transformer so that the windings of the transformer and the joints between their terminals and the cable leads are relieved of all mechanical stresses such as tension created by pull on the cables and forces tending to displace the parts during the operation required to form the casing, as is also the juncture between the cables and the casing enclosing the transformer.

In the present embodiment this is accomplished by the provision of anchoring means in the form of what may be termed a harness, by means of which the ends of the cable are firmly located mechanically with respect to the core of the transformer. This means comprises a pair of eye members 50 and 52, preferably of non-metallic material having relatively strong physical properties and high dielectric strength, such for example as bakelite or equivalent material. The members 50 and 52 are suitably apertured to fit snugly over the projecting portions of the core at opposite sides of the transformer coil and at one end have projecting tongues 54 and 56 which in turn are provided with apertures 58 and 60 through which extend the tongues 62 and 64 of a transversely extending anchor bar 66, advantageously of the same material as the eye members. The parts are preferably held in assembled relation by cotter pins or the like as seen at 68. The bar 66 is suitably apertured to permit the cables 28, 30 and 48 to pass through it in spaced relation for connection to the ends of the transformer windings. At the places where the cables pass through the anchor bar they are firmly fixed relative to the bar. In the present instance this is accomplished by means of metal clamping rings such as rings 70 and 72, which are crimped around the cable 48 on opposite sides of the bar to firmly clamp it against movement relative to the bar and to transmit to the latter tension or compressive forces between the cables and the transformer. As will be evident, with this construction the joints between the leads and the windings are relieved from all mechanical strain as are also the terminal end portions of the transformer windings, the latter being particularly important because of the fact that in some instances the wires of the windings are relatively fine with little mechanical strength. Similarly, the primary cables 28 and 30 are anchored by means of clamp rings 74 and 76, and 78 and 80, respectively.

After the above described parts are assembled, the unit is then completed by forming around the transformer structure and the ends of the cables a casing 82 in which the transformer is hermetically sealed and to which the cables are also bonded to provide a hermetic seal between the cables and casing.

In order to provide a satisfactory transformer of the kind under consideration, attention must be given to the material of which the casing is formed.

Primarily, the material must be moldable and in order to be fully satisfactory should possess certain additional properties of which the following are important. It should be non-porous to both gases and liquids and should be substantially impervious to acids and alkalis of the kind and concentrations ordinarily encountered in earth installations. It should be substantially impervious to deterioration from the action of the atmosphere, particularly with reference to sun rays. It should be capable of resisting, without adversely affecting its mechanical and electrical properties, extremes of temperature conditions from subzero temperatures to the high temperatures encountered in above ground installations in tropic or desert locations. It should be relatively firm and nonfrangible and preferably have a certain degree of elasticity. It should be as free as possible from inherent "ageing" with time. It should have reasonably good physical properties, particularly the quality of toughness and should have relative high dielectric strength. Furthermore it must be "compatible" with the covering of the cables to which it is bonded, to the extent required to provide a hermetic bond between the casing and the cables. Because of the latter factor, the materials of which the cables are made must be taken into account when selecting the casing material. As previously mentioned, flexible cables suitable for direct ground burial have previously been employed and in the development of such cables it has been found that in the present state of the materials art, the class of materials which most satisfactorily meets requirements of the nature of those noted above are synthetic polymers of compounds productive of products generically known as "synthetic rubber," of which the following may be mentioned as examples: "GR–S" (Government Rubber, Styrene) a polymeric product of butadiene and styrene; "Low Temperature Rubber," also a polymeric product of butadiene and styrene; "neoprene," which is a generic term for a number of chloroprene polymers of different grades and designated as GR–M plus numerical designations for the several grades; "Butyl Rubber" a copolymer of isobutylene and isoprene; and "Buna N" (GR–A, Government Rubber, Acrylonitrile) a copolymer of butadiene and acrylonitrile. To those skilled in the materials art it will be evident that a substantial variety of materials suitable for the purpose are available. Such other materials may include synthetic resins such as "polythene." Also, while it is possible to mold a casing from natural rubber which can be bonded to cables covered with compatible material, the use of natural rubber is not to be recommended because of its inherent deterioration with time, or so-called "ageing" characteristic. The specific material employed will therefore be dictated by specific conditions in different cases, one of which is the covering material of the cables to which the transformer casing must be bonded.

Of the foregoing materials, neoprene is one of the more satisfactory and for purposes of further description herein it will be assumed, without limitation, that neoprene is the material employed.

Also it is to be noted that in the production of cables of the kind under consideration the covering for the wires is often different from that of the outer covering, as for example a core of natural rubber or other insulating material covered by a sheath of neoprene or other material having the desired physical properties noted above. Since the specific internal construction of the cables is not germane to this invention, the term "sheathing" as employed herein is to be considered as referring to the outer covering of the cables regardless of whether that constitutes the sole insulation for the conductors or other insulating mtaerials are used internally of the cable.

The casing 82 is formed by molding the casing material under pressure around the transformer structure and the ends of the attached cables, with the assembly enclosed in a suitable mold cavity, so that not only is the enclosing casing formed and bonded to the cables but voids in the structure are filled with the molded material, the cavity being suitably vented to permit the escape of air or other gases from the cavity. For this purpose, pot molding apparatus has been found satisfactory and for purposes of describing the invention an example of such apparatus has been illustrated and will now be described, it being understood that insofar as the present invention is concerned other forms of molding apparatus may be employed.

Referring now to Figs. 4 and 5, a suitable form of pot molding apparatus is shown in which the mold comprises upper and lower mold or die blocks 84 and 86, formed with confronting and mating cavities 88 and 90, respectively, which when the blocks are together form a cavity for the transformer structure. The transformer structure is held in fixed spaced relation to the walls of the cavity by suitable centering means, which in the example shown comprise four studs 92 projecting upwardly in the cavity and shouldered to provide small centering pins 94 adapted to project into suitable holes in the core 12 which rests on the shoulders. Similar studs 96 providing centering pins 98 project downwardly from the upper block 86. The upper and lower blocks are each provided with semi-circular grooves leading from the respective recesses 88 and 90 to exterior of the blocks, these grooves mating to provide passages for the reception of the cables leading to the transformer when the blocks are closed with a transformer in place, as seen at 100, 102, and 104 in Fig. 5 and at 106 and 108 in Fig. 4.

The walls of the grooves 100, 102, and 104 are transversely ridged by serrations or corrugations, as seen more clearly in Fig. 5, it being understood that the walls of the grooves such as 106 and 108 in the block 86 are similarly formed. Advantageously the transverse ridges may be formed by a helical thread having a rounded or other blunt crest. The diameters of the ridged grooves are such that when the blocks are closed for the molding operation, the cables are tightly clamped by the ridged surfaces to prevent axial displacement of the cables relative to the blocks. Guide pins 112 projecting upwardly from the lower block and adapted to enter holes 114 in the upper block may also be provided for holding the cables in position until the blocks are closed.

The lower block is further provided with a vent passage 116 leading from the cavity 88 to the exterior of the block.

The upper block is provided with depending studs 118 adapted to enter mating holes 120 in the lower block to center the blocks when they are closed and may further be provided with handles 122 for manipulating the block. The upper face of the upper block 86 is recessed to provide a cavity 124 for the reception of the material to be molded, and this cavity is connected with the mold cavity by sprue passages 126 and 128 which at their lower ends communicate with the recess 90 by way of the sprue grooves 130 and 132 cut in the lower face of block 86. A pressure member 134, advantageously having manipulating handles 136 is formed with a depending plunger or piston portion 138 shaped to mate with the cavity 124 (both advantageously being circular) and is further provided with depending centering studs 140 adapted to enter mating holes 142 in block 86.

The general manner in which the molding operation is effected will largely be evident from the drawings. The transformer with its attached cables is first placed in proper position in the cavity of the lower block and the upper and lower blocks brought together. A suitable quantity of the material to be molded is placed in the cavity 124 and the pressure member 130 placed over the upper block 86. The assembly is then placed in a suitable press, indicated in the drawing by lower and upper platens 144 and 146. The required pressure is then applied and the molding material is forced by the plunger 138 out of cavity 124 through the sprue passages into the mold cavity, forcing air or gases out of the cavity and the voids in the transformer structure through the vent 116, and filling the cavity to form the desired casing and also to fill the said voids. Since in order to insure the desired filling of the voids throughout the transformer structure, high pressures of the order of a ton or more per square inch are employed, the ridged clamping passages for the cables are employed to prevent internal pressure developed in the mold cavity from forcing the cables out of their respective channels in the die.

The kind of transformer unit above described, which is characterized by a molded casing, and the apparatus for molding it, form per se no part of the present invention, the novel features of the article and the apparatus being claimed in the Merrill et al. application Serial No. 132,335, aforesaid.

While the foregoing description is sufficient for a general understanding of the pressure molding operation, other factors must be taken into consideration when the molded material is of the class which requires molding at elevated temperature and partciularly when the material requires to be held at elevated temperature for "curing" after completion of the molding operation, and it is in connection with the molding and curing of such materials that the present invention is concerned.

Since neoprene is a satisfactory material for the purpose and requires heat both for molding and curing, the invention will hereinafter be discussed as applied in the manufacture of a unit having a casing of that material and by way of example a particular type of transformer will be described, but it will be understood that the invention is equally applicable with other materials and for other specific transformer constructions.

For the molding and curing of a neoprene casing, a temperature of the order of 300° F. has been found satisfactory and in accordance with usual practice the die blocks are maintained at such temperature. This may be accomplished in any suitable way, as by conduction from hot press platens or by direct heating of the blocks by electrical resistances, steam or the like. Regardless, however, of the means by which the die blocks are heated, the application of heat to the material being molded solely from the die blocks is not wholly satisfactory for a number of reasons. In order to obtain an end product of desired quality, the molded material should penetrate and fill to the greatest possible extent the many voids in the transformer structure and the molded material should moreover be uniformly cured throughout, the latter generally requiring that the mass of molded material be held at a substantially stabilized temperature for an appreciable period of time. When heat is applied only from the mold the paths of conduction of heat through the material are not only relatively long but of materially different length in different parts of the unit, with the result that in order to bring the entire molded mass to the desired stabilized temperature and maintain those portions most remote from the source of heat at the desired temperature for the required time, other portions of the mass closer to the source of heat may have to be held at the elevated temperature so long that they become "overcured," with resultant impairment of physical and electrical properties. Also, applicaion of heat solely from the mold requires a relatively long time cycle, which, even if not resulting in overcuring, results in low production capacity of the molds and presses.

Furthermore, if the mass of the transformer assembly is at normal temperature at the time of the molding operation, the chilling of the relatively small streams of heated molding material attempting to enter and fill the voids in the structure is likely to produce "cold shuts" and prevent proper filling of the voids. In order to avoid or minimize this, it has been proposed in the disclosure of the aforesaid application Serial No. 132,335 to preheat the transformer to an appropriate stabilized temperature for molding before introducing the structure into the mold and various means for effecting such preheating have been suggested.

While preheating is effective to improve molding results from the standpoint of cold shuts and the like, the heat required to maintain the desired temperature during the curing period is still supplied solely from the mold in accordance with previous procedure with the resultant potential difficulties previously discussed.

In accordance with the present invention, the molding and curing operation is expedited and improved upon by heating the transformer structure during that operation, thus very materially shortening the longest path of heat conduction through the material from a source of heat and improving the uniformity of the curing, not only of the principal mass of the casing wall but also of the relatively small masses of material in the voids of the transformer structure, which should also be properly cured if the best quality of end product is to be secured.

Since during the molding and curing operation this transformer is enclosed in the cavity of a mold, usual heating methods for heating it during the operation are not available, but in accordance with this invention the presence of the transformer coils within the mold, with externally accessible terminals, is made use of to effect the desired heating of the assembly by supplying current of an appropriate nature to one or more of the transformer coils during the molding and/or curing operation. This may be accomplished by different specific procedures, utilizing different electrical characteristics of the transformer structure and different types of current, the particular procedure most advantageous in a given instance being largely dictated by the specific physical and electrical characteristics of the transformer being treated and the nature of the most readily available current.

As is well known, transformers are not 100% efficient, due to hysteresis and other losses, and the loss is reflected in a temperature rise of the transformer when it is operated at normal load. By proper design this temperature rise can be limited to a predetermined value when the transformer is operated with current of the kind for which it is designed, but if for example current is supplied to the transformer at a higher cycle frequency than that for which the transformer is designed, the losses and resultant temperature rise increase. By taking advantage of this characteristic, one specific procedure for carrying the present invention into effect maintains the transformer at desired molding temperature while enclosed in the mold by supplying to it current of higher than designed cycle frequency. The extent to which the frequency is increased and the particular coil or coils to which the current is supplied will vary in accordance with the particular transformer design and the characteristics such as molding temperature, maximum safe temperature and curing time of the specific molding material employed. By way of example but without limitations the application of such procedure to the manufacture of a transformer of the kind previously described may be given.

A typical transformer of the kind shown in the drawings is intended for use in a so-called isolation system in which neither the primary nor the secondary circuits are grounded and the primary is supplied with 50–60 cycle current at some 5000 volts above ground potential, the transformer being designed for equal current flow in primary and secondary and the secondary supplying current of low potential as compared with ground, for example, of the order of 28 volts open circuit voltage and around 7 volts closed circuit voltage. Such a transformer having a capacity of 30–45 watts requires windings of only a relatively few layers of heavy gauge wire, the weight of the core and coil assembly being in the neighborhood of three pounds. In the example shown the primary is wound outside of the secondary.

For heating such a transformer, current of higher than normal frequency may be supplied to either or both coils, but experience has shown that proper current supplied to one coil is adequate. Since the heating by high frequency current is in effect inductive it is usually preferable to pass the current through the inner coil, but in some cases where the inner coil is the secondary and the nature of the transformer is such that the secondary wire is relatively fine, it may be found preferable to pass the current through the primary even though it is the outer coil.

The range of frequencies that may be employed is very wide but in general it may be said that a frequency several times normal is desirable. Thus for the specific transformer mentioned above, 110 volt current of 420 cycles has been found adequate to heat the transformer from normal temperature to substantially molding temperature for neoprene molding in approximately ten minutes. In other cases, different electrical properties, such as the impedance, of the coil employed, may require much higher frequencies in order to secure the desired results, and in some instances the nature of the situation may make the use of extremely high frequencies of the order of radio frequencies advisable.

While usually inductive heating through the use of higher than normal frequency will be found preferable, because of its action in heating the mass of the transformer core, heating also can be accomplished by using direct current and imposing such heavy current flow through one or both of the coils that they act in effect as resistance heating elements for heating the entire assembly. It will thus be evident that in each case the nature of the current, either direct or alternating, and factors such as voltages, amperages and frequencies will be governed by the specific conditions encountered. Obviously, any suitable source of the desired kind and nature of current desired, of which there are many known kinds, may be employed.

So far as the present invention is concerned the maintenance of the transformer at elevated temperature after it has been enclosed in the mold is the primary objective. It will be evident that the transformer might be placed in the mold at normal temperature and thereafter brought to molding temperature by the application of current. Such procedure is, however, not economical from the standpoint of efficient use of the mold and the preferred procedure is to preheat the transformer to bring it to a stabilized heat at or about the molding temperature before it is placed in the mold. While different means, such as heated plates applied to the core for heating it by conduction may be employed for preheating the transformer outside the mold, it has been found that not only for maintaining the transformer at elevated temperature within the mold, but also for preheating it from normal temperature, electrical heating by use of current is satisfactory and may usually be found preferable from an operating standpoint, since such procedure involves but one heating operation for preheating and the molding and curing operation, and the heating can readily be made continuous or substantially continuous in order to effect closer temperature control.

Practical considerations will of course place limitations upon the maximum rate of rise and ultimate temperature desired to be maintained and thus must be taken into consideration in the choice of current to be employed in a specific case. This, however, is a matter well within the scope of ability of one skilled in the art without more detailed instruction.

The advantages to be derived from use of the invention are largely obvious. By simultaneously heating from both the exterior and the interior of the molded casing quicker and more uniform curing of the casing is obtained, and in the case of a neoprene molding and curing operation for a transformer of the kind hereinbefore described, the increase in productivity of expensive molding and press equipment is substantial, in view of the fact that a reduction in the curing time of as much as 35% may be expected as compared with an approximate 20 to 30 minute curing period required even with a preheated transformer, by mold heating alone during the molding and curing operation. Also, by maintaining the transformer at elevated temperature during the curing period by heating during that period proper curing of the molded material in the internal voids of the transformer structure is insured.

From the foregoing it will be evident that the invention is susceptible to many variations of the specific steps employed to meet different specific conditions and is therefore to be understood as including all procedures falling within the scope of the appended claims.

What is claimed:

1. In the manufacture of a transformer unit of the kind having a casing of molded non-metallic material required to be maintained at elevated temperature for molding and subsequent curing, the steps of placing a transformer assembly of core and windings in a cavity in a mold in spaced relation to the walls of the mold, forcing said material into said cavity to mold said casing around said assembly and maintaining said assembly at elevated temperature during the subsequent curing period by passing current through at least one of said windings at a higher cycle frequency than that for which the winding is designed.

2. The method of making a transformer unit of the kind having a casing of molded non-metallic material requiring to be molded and cured at elevated temperature which includes the steps of preheating a transformer assembly of core and windings to desired temperature, placing the preheated assembly in a cavity in a heated mold, molding the casing, retaining the molded article in the mold for a subsequent curing period and continuing to heat the transformer assembly during the curing period by passing through at least one of the windings of the coil current of higher cycle frequency than that for which the winding is designed.

3. The method of making a transformer unit of the kind having a casing of molded non-metallic material requiring to be molded and cured at elevated temperature which includes the steps of preheating a transformer assembly of core and windings to desired temperature by passing through at least one of said windings current of higher cycle frequency than that for which the winding is designed, placing the preheated assembly in a cavity in a heated mold, molding the casing retaining the molded article in the mold for a subsequent curing period and continuing to supply said current to said winding during the curing period.

4. The method of making a transformer unit of the kind having a casing of molded non-metallic material requiring to be molded and cured at elevated temperature which includes the steps of attaching the conductors of input and output cables to the windings of a transformer assembly of core and windings, preheating the assembly to desired temperature, placing the preheated assembly in a cavity in a heated mold provided with passages through which said cables extend to the exterior of the mold, molding said casing and thereafter heating the molded assembly while retaining it within said cavity by connecting appropriate ones of said cables to a source of current of higher cycle frequency than that for which said windings are designed to thereby pass such current through at least one of said windings.

5. In the manufacture of a transformer unit of the kind having a core and associated windings enclosed in a molded casing of non-metallic material, that improvement which consists in passing current through at least one of said windings at a higher cycle frequency than that for which the winding is designed during the molding operation for forming said casing, whereby to heat and maintain the transformer structure at elevated temperature during said operation.

6. In the manufacture of a transformer unit of the kind having a core and associated windings enclosed in a molded casing of non-metallic material, that improvement which consists in passing current through at least one of said windings at a cycle frequency several times that for which the winding is designed during the molding operation for forming said casing, whereby to heat and maintain the transformer structure at elevated temperature during said operation.

7. In the manufacture of a transformer unit of the kind having a core and associated inner and outer windings enclosed in a molded casing of non-metallic material, that improvement which consists in passing current through the outer one of said windings at a higher cycle frequency than that for which the winding is designed during the molding operation for forming said casing, whereby to heat and maintain the transformer structure at elevated temperature during said operation.

8. In the manufacture of a transformer unit of the kind having a core and associated inner and outer windings enclosed in a molded casing of non-metallic material, that improvement which consists in passing current through the inner one of said windings at a higher cycle frequency than that for which the winding is designed during the molding operation for forming said casing, whereby to heat and maintain the transformer structure at elevated temperature during said operation.

9. In the manufacture of a transformer unit of the kind having a core and associated windings enclosed in a casing of molded non-metallic material requiring to be molded and cured at elevated temperature that improvement which consists in preheating the assembly of core and windings prior to the molding operation by passing through at least one of the windings current of higher cycle frequency than that for which the winding is designed and continuing to pass said current through said winding during the molding and curing operations.

References Cited in the file of this patent

UNITED STATES PATENTS

| Number | Name | Date |
|---|---|---|
| Re. 15,429 | George | Aug. 8, 1922 |
| 1,216,654 | Burke | Feb. 20, 1917 |
| 1,742,018 | Wermine | Dec. 31, 1929 |
| 1,763,115 | Wermine | June 10, 1930 |
| 1,811,086 | Kasch | June 23, 1931 |
| 1,826,297 | Apple | Oct. 6, 1931 |
| 1,960,120 | Mohring | May 22, 1934 |
| 2,385,460 | Omansky | Sept. 25, 1945 |
| 2,414,525 | Hill et al. | Jan. 21, 1947 |
| 2,464,029 | Ehrman | Mar. 8, 1949 |
| 2,505,104 | D'Orio | Apr. 25, 1950 |